Nov. 6, 1928.   
J. L. OPITZ   
1,690,548

STEERING MECHANISM FOR TRACTORS

Filed Dec. 23, 1924

Inventor
John L. Opitz
by Ewing & Hague, Attys.

Patented Nov. 6, 1928.

1,690,548

UNITED STATES PATENT OFFICE.

JOHN LOUIS OPITZ, OF CLARINDA, IOWA.

STEERING MECHANISM FOR TRACTORS.

Application filed December 23, 1924. Serial No. 757,662.

The object of my invention is to provide improved detachable means for actuating the steering mechanism of tractors, so constructed and arranged that it may be easily and quickly applied or removed, and especially designed to be used in connection with that type of front axles which are substituted for the standard axles.

A further object is to provide improved means for bracing the tractor when the substituted axle is placed into position, said bracing means being designed to carry a portion of the steering mechanism so that they may be easily and quickly attached.

My invention consists in the construction, arrangement and combination of the various parts of the device, whereby the objects contemplated are attained, as hereinafter more fully set forth, pointed out in my claims, and illustrated in the accompanying drawings, in which:

Figure 1:
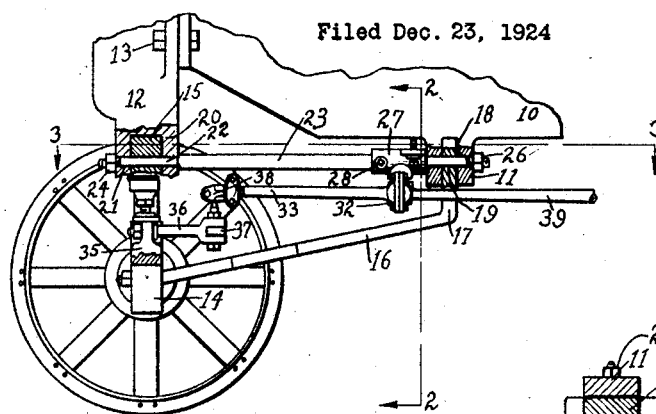
Figure 1 is a side elevation of a segmental portion of a traction engine frame showing the substituted axle applied thereto, and the manner in which my improved detachable actuating means is applied.
Figure 3:
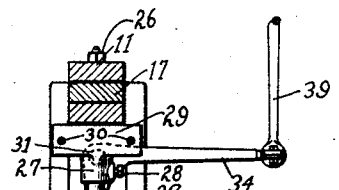
Figure 3 is a sectional view taken on the line 3—3 of Figure 1.
Figure 4:
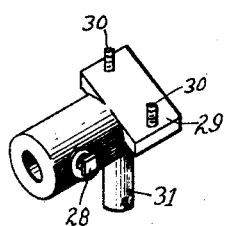
Figure 4 is a perspective view of the detachable pivot member.
Figure 2:
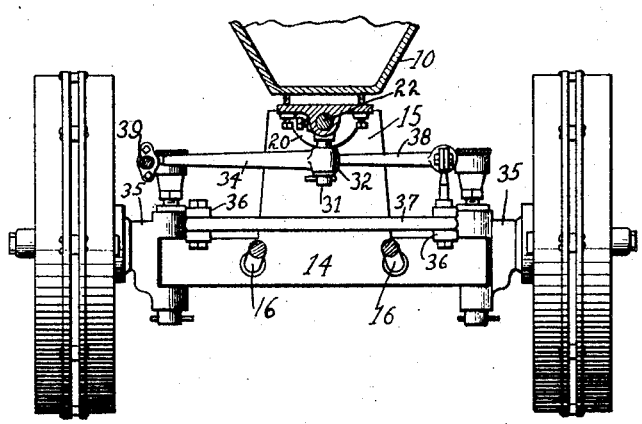
Figure 2 is a transverse sectional view taken on the line 2—2 of Figure 1.

The numeral 10 indicates a portion of the frame member of a tractor, the bottom side of which is provided with a pair of downwardly extending lugs 11. Adjacent to the forward end of the member 10 is a radiator supporting bracket 12 which extends downwardly therefrom. The member 12 is secured to the member 10 by means of bolts 13.

The numeral 14 indicates the substitute axle which is considerably shorter than the standard axle and is provided with an upwardly extending support 15, which elevates the main tractor frame. The axle 14 is provided with a U-shaped radius rod 16, the rear end of which is provided with upwardly extending portion 17 which extends between the flanges 11. The said flanges 11 are provided with an opening 18, and the member 17 is provided with an opening 19, said openings being in alinement with each other. The upper end of the member 15 is mounted between downwardly extending lugs 20 from the member 12. The said members 20 and the member 15 are also provided with alined openings 21 which are in alinement with the openings 18 and 19. A rod 22 is provided for said openings, having a sleeve 23 to rest between said members 15 and 20.

The opposite end of the shaft 22 extends through the openings 18 and 19 and has its rear end screw threaded and provided with a nut 26.

The shaft 22 is provided with a sleeve 27 secured in position over the sleeve 23 and adjacent to the forward face of the front member 11 by means of a set screw 28. Said sleeve 27 is provided with laterally extending flanges 29, each of which is designed to carry a set screw 30. Said set screws 30 are designed to extend upwardly and engage the lower face of the member 10 to prevent rotation of the sleeve about the shaft 22. The under face of the sleeve 27 is provided with a downwardly extending pin 31 designed to support a bell crank lever 32, said lever being provided with a forwardly extending portion 33 and a laterally extending portion 34.

The axle 14 has at each end a spindle 35, each of which is provided with a steering arm 36, said steering arms being connected by a steering link 37. The free end of the arm 33 is provided with a link 38 pivotally connected to one of the arms 36, while the arm 34 is pivotally connected to the forward end of the drive link 39, which is a part of the regular steering mechanism.

Thus it will be seen that if longitudinal movement is imparted to the member 39, the lever 32 will be oscillated on the pivot 31, causing the link 37 to be moved longitudinally and the arms 36 to be oscillated, and in turn the spindles 35. The rod 22 serves as an anchorage for the pin 31, and also as a brace for the downwardly extending members 22 to brace the said members against forward and rearward movement.

It will be seen that there is considerable tendency for the support 15 to rock forwardly and rearwardly, which would impart a bending strain to the radius rod 16. By providing the shaft 22, I have provided means whereby the upper end of the support 15 will be held against said forward and rearward movement. The said rod serves to also support the pivot member 31. By this arrangement the front axle 14 may be easily and quickly detached by simply removing the nut 26 and loosening the set screw 28 and sliding the rod 22 forwardly.

This will disengage the radius rod 16 and the support 15, making the entire front axle and the steering mechanism easily and quickly detachable, and at the same time providing a brace for the upper end of the member 15.

I claim as my invention:

1. In combination, a frame member having a downwardly extending lug, said lug being provided with a horizontally extending opening, a radiator supporting frame member provided with a downwardly extending lug, said lug being provided with an opening in alinement with the first said opening, a shaft extending through said opening, an axle member pivotally connected adjacent to the downwardly extending member of said radiator support, said axle being provided with a radius rod, one end of which is pivotally connected to the rear end of said shaft, a sleeve detachably secured to said shaft having a downwardly extending pin, a lever pivotally connected to said pin, means for imparting movement to said lever, a spindle pivotally mounted to each end of said axle, and means operatively connecting said lever and said spindle whereby movement of said lever will impart pivotal movement to said spindles.

2. In combination, a tractor frame, an axle pivotally mounted thereto, wheel spindles pivotally mounted on said axle, means for imparting movement to said spindles comprising a rearwardly extending arm for each of said spindles, a link for connecting said arms, a shaft detachably supported below said frame, a sleeve detachably supported to said shaft, said sleeve being provided with a downwardly extending pin, a lever pivoted to said pin, and a link for connecting one end of said lever with one of said steering arms.

3. In combination, a tractor frame having its lower face provided with a downwardly extending lug, an auxiliary frame member at the forward end of said tractor frame, an axle having an upright support and a radius rod, pivoted spindles for said axle, a shaft for pivotally mounting the radius rod with the said downwardly extending lug of said tractor frame and the upwardly extending portion of said axle with the said auxiliary frame member, a sleeve detachably mounted on said shaft having laterally extending lugs, an upwardly extending set screw for each of said lugs, a downwardly extending pin for said sleeve, a lever pivotally mounted on said pin, and means actuated by said lever for imparting movement to the spindles of said axle.

4. In a device of the class described, a shaft having each end contracted and screw threaded, a nut for each screw threaded portion, a sleeve detachably supported on the enlarged portion of said shaft, said sleeve being provided with laterally extending lugs, a set screw for each of said lugs, a perpendicularly extending pin on said sleeve for receiving a lever device of a steering mechanism.

5. In a device of the class described, a shaft having each end contracted and screw threaded, a nut for each screw threaded portion, a sleeve detachably supported on the enlarged portion of said shaft, said sleeve being provided with laterally extending lugs, a set screw for each of said lugs, a perpendicularly extending pin on said sleeve, and a lever pivotally connected to said pin, substantially as described and for the purposes stated.

6. In a device of the class described, a sleeve having laterally projecting flanges and a downwardly projecting pivot pin, a set screw for each of said flanges, a bell crank lever pivotally connected to said downwardly extending pin, and a link for each end of said bell crank lever.

7. In a device of the class described, a sleeve having laterally projecting flanges and a downwardly projecting pivot pin, a set screw for each of said flanges, a bell crank lever pivotally connected to said downwardly extending pin, a link for each end of said bell crank lever, and a set screw for said sleeve.

8. In combination, a tractor, an axle pivotally mounted thereto, wheel spindles pivotally mounted on said axle, means for imparting movement to said spindles comprising a shaft for pivotally mounting the axle to said tractor frame, a sleeve supported on said shaft, said sleeve being provided with a downwardly extending pivot pin, a bell crank lever on said pivot pin, a link device for operatively connecting said bell crank lever with said spindles.

JOHN LOUIS OPITZ.